United States Patent
Kong et al.

[11] Patent Number: 6,114,276
[45] Date of Patent: Sep. 5, 2000

[54] CATALYST SYSTEM FOR OLEFIN POLYMERIZATION AND ITS USE

[75] Inventors: Gap-Goung Kong, Yusong-gu Taejeon; Gyo-Hyun Hwang, Taejon, both of Rep. of Korea

[73] Assignee: Samsung General Chemicals Co., Ltd., Rep. of Korea

[21] Appl. No.: 09/148,964

[22] Filed: Sep. 5, 1998

[30] Foreign Application Priority Data

Sep. 11, 1997 [KR] Rep. of Korea .................. 97-46780

[51] Int. Cl.[7] .................. B01J 27/138; B01J 31/00; B01J 27/135; C08F 4/44
[52] U.S. Cl. .................. 502/226; 502/108; 502/123; 502/124; 502/167; 502/227; 526/124.2; 526/160; 526/161
[58] Field of Search .................. 502/108, 123, 502/124, 226, 227, 167; 526/124.2, 160, 161

[56] References Cited

U.S. PATENT DOCUMENTS

| | | | |
|---|---|---|---|
| 3,332,927 | 7/1967 | Cottingham | 526/124.2 |
| 3,632,620 | 1/1972 | Kober et al. | 502/224 |
| 4,013,823 | 3/1977 | Longi et al. | 526/124.9 |
| 4,069,169 | 1/1978 | Toyoda et al. | 252/429 B |
| 4,071,672 | 1/1978 | Kashiwa | 526/122 |
| 4,071,674 | 1/1978 | Kashiwa et al. | 526/125 |
| 4,076,924 | 2/1978 | Toyota et al. | 526/125 |
| 4,085,276 | 4/1978 | Toyota et al. | 526/122 |
| 4,107,413 | 8/1978 | Giannini et al. | 526/114 |
| 4,107,414 | 8/1978 | Giannini et al. | 526/114 |
| 4,107,415 | 8/1978 | Giannini et al. | 526/114 |
| 4,156,063 | 5/1979 | Giannini et al. | 526/114 |
| 4,157,435 | 6/1979 | Toyota et al. | 526/125 |
| 4,187,196 | 2/1980 | Giannini et al. | 252/429 B |
| 4,220,554 | 9/1980 | Scatá et al. | 252/429 B |
| 4,226,963 | 10/1980 | Giannini et al. | 526/114 |
| 4,263,169 | 4/1981 | Scata et al. | 502/127 |
| 4,315,835 | 2/1982 | Scatá et al. | 252/429 B |
| 4,315,874 | 2/1982 | Ushida et al. | 264/5 |
| 4,330,649 | 5/1982 | Kioka et al. | 526/125 |
| 4,336,360 | 6/1982 | Giannini et al. | 526/114 |
| 4,380,507 | 4/1983 | Noristi et al. | 502/104 |
| 4,384,983 | 5/1983 | Hoff | 502/124 |
| 4,399,054 | 8/1983 | Ferraris et al. | 252/429 B |
| 4,401,589 | 8/1983 | Kioka et al. | 252/429 B |
| 4,434,282 | 2/1984 | Esneault | 526/124.2 |
| 4,439,540 | 3/1984 | Cecchin et al. | 252/429 B |

(List continued on next page.)

FOREIGN PATENT DOCUMENTS

| | | |
|---|---|---|
| 0 602 922 | 6/1994 | European Pat. Off. . |
| 0 606 125 A2 | 7/1994 | European Pat. Off. . |
| 58-83006 | 5/1983 | Japan . |
| 63-54004 | 10/1988 | Japan . |

OTHER PUBLICATIONS

Dialog–Web search results for English–language abstract for Japanese patent No. 58 83006 published Sep. 23, 1998 (2 sheets).

Dialog–Web search results for English–language abstract for Japanese patent No. 63 54004 published Sep. 23, 1998 (3 sheets).

(List continued on next page.)

*Primary Examiner*—Mark L. Bell
*Assistant Examiner*—Patricia L. Hailey
*Attorney, Agent, or Firm*—Conley, Rose & Tayon, PC

[57] ABSTRACT

A heterogeneous catalyst system comprising a novel titanium catalyst component, the product of a sequential reaction of titanium halide with carbodiimide compound and an organometallic aluminum compound, supported on such an inorganic carrier as magnesium halide and an organometallic aluminum cocatalyst component which is not methylaluminoxane, and a process for polymerization of olefin using the said catalyst system. The catalyst system has an excellent (co)polymerization properties and produces copolymers having a narrow compositional distribution, a broad molecular weight distribution and excellent morphological properties such as spherical shape and a high bulk density.

11 Claims, 1 Drawing Sheet

Plot of Tm vs. ΔH

U.S. PATENT DOCUMENTS

| | | | |
|---|---|---|---|
| 4,514,513 | 4/1985 | Sato et al. | 502/112 |
| 4,529,716 | 7/1985 | Banzi et al. | 502/121 |
| 4,614,727 | 9/1986 | Longi et al. | 502/105 |
| 4,642,328 | 2/1987 | Morterol et al. | 526/124.2 |
| 4,761,392 | 8/1988 | Shiga et al. | 502/126 |
| 4,806,433 | 2/1989 | Sasaki et al. | 502/115 |
| 4,866,022 | 9/1989 | Arzoumanidis et al. | 502/120 |
| 4,912,074 | 3/1990 | Miro | 502/104 |
| 4,946,816 | 8/1990 | Cohen et al. | 502/126 |
| 4,952,649 | 8/1990 | Kioka et al. | 526/125 |
| 4,978,648 | 12/1990 | Barbé et al. | 502/127 |
| 4,988,656 | 1/1991 | Arzoumanidis et al. | 502/127 |
| 4,990,479 | 2/1991 | Ishimaru et al. | 502/125 |
| 5,013,702 | 5/1991 | Arzoumanidis et al. | 502/120 |
| 5,081,090 | 1/1992 | Arzoumanidis et al. | 502/126 |
| 5,104,838 | 4/1992 | Fujita et al. | 502/108 |
| 5,124,297 | 6/1992 | Arzoumanidis et al. | 502/120 |
| 5,134,104 | 7/1992 | Sasaki et al. | 502/103 |
| 5,175,332 | 12/1992 | Chatterton et al. | 556/482 |
| 5,182,245 | 1/1993 | Arzoumanidis et al. | 502/115 |
| 5,502,128 | 3/1996 | Flores et al. | 526/160 |
| 5,643,845 | 7/1997 | Tajima et al. | 502/103 |
| 5,780,378 | 7/1998 | Toida et al. | 502/126 |
| 5,798,424 | 8/1998 | Kong et al. | 526/124.2 |
| 5,880,056 | 3/1999 | Tsutsui et al. | 502/103 |
| 5,936,049 | 8/1999 | Kojoh et al. | 526/114 |

OTHER PUBLICATIONS

Dialog–Web search results for English–language abstract for Belgium patent No. 895019 A published Jan. 19, 1999 (1 sheet).

Dialog–Web search results for English–language abstract for German patent No. 3241999 C published Jan. 19, 1999 (1 sheet).

Dialog–Web search results for English–language abstract for United Kingdom patent No. 2,111,066 published Jan. 19, 1999 (1 sheet).

Dialog–Web search results for English–language abstract for German patent No. 2,153,520 A published Oct. 30, 1998 (1 sheet).

Dialog–Web search results for English–language abstract for German patent 2,230,672 A published Oct. 30, 1998 (2 sheet).

Dialog–Web search results for English–language abstract for German patent 2,230,728 A published Oct. 30, 1998 (1 sheet).

Dialog–Web search results for English–language abstract for German patent 2,230,752 A published Oct. 30, 1998 (1 sheet).

Dialog–Web search results for English–language abstract for German patent 2,504,036 A published Oct. 30, 1998 (1 sheet).

Dialog–Web search results for English–language abstract for German patent 2,553,104 A published Oct. 30, 1998 (1 sheet).

Dialog–Web search results for English–language abstract for German patent 2,605,922 A published Oct. 30, 1998 (2 sheet).

Dialog–Web search results for English–language abstract for European patent 0 602 922 A2 published Oct. 30, 1998 (1 sheet).

Dialog–Web search results for English–language abstract for Japanese patent 51–28189 published Oct. 29, 1998 (3 sheets).

Linden et al, "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Phenoxide Titanium and Zirconium Species," Journal of the American Chemical Society vol. 117, 1995, pp. 3008–3021.

Tinkler, et al, "Polymerisation of ethene by the novel titanium complex [Ti(Me$_3$SiNCH$_2$ CH$_2$NSi Me$_3$)Cl$_2$];a metallocene analogue," Chemical Communications, Cambridge, England, UK, 1996, pp. 2623–2624. Aug. 1996.

Zhou, et al, Bulky Amidinate Complexes of Tin(IV). Synthesis and Structure of Sn(RNC(R')NR)$_2$Cl$_2$ (R=Cyclohexyl, R'=H, Me; R=SiMe$_3$, R'=$^t$Bu), Inorganic Chemistry, published by the American Chemical Society, vol. 36 1997, pp. 501–504. Aug. 1996.

Zhou, et al, "Synthesis and Structure of Novel Bridged Dinuclear Indium Complexes," Inorganic Chemistry, published by the American Chemical Society, vol. 35, 1996, pp. 1423–1424. Sep. 1995.

Stokes, et al, "Reactions of Cobaloxime Anions and/or Hydrides with Enynes as a New, General Route to 1,3– and 1,2–Dienylcobaloxime Complexes," Organometallics, 1996, vol. 15, pp. 2627. Jan. 1996.

Edelmann, "N–silylated benzamidines: versatile building blocks in main group and coordination chemistry," published in Coordination Chemistry Reviews, 1994, vol. 137, pp. 403–481. Feb. 1994.

Dialog Web Search Results including Patent Abstracts of Japan for publication No. 63–191811 A published Aug. 9, 1988.

Dialog Web Search Results including Patent Abstracts of Japan for publication No. 6–340711 published Dec. 13, 1994.

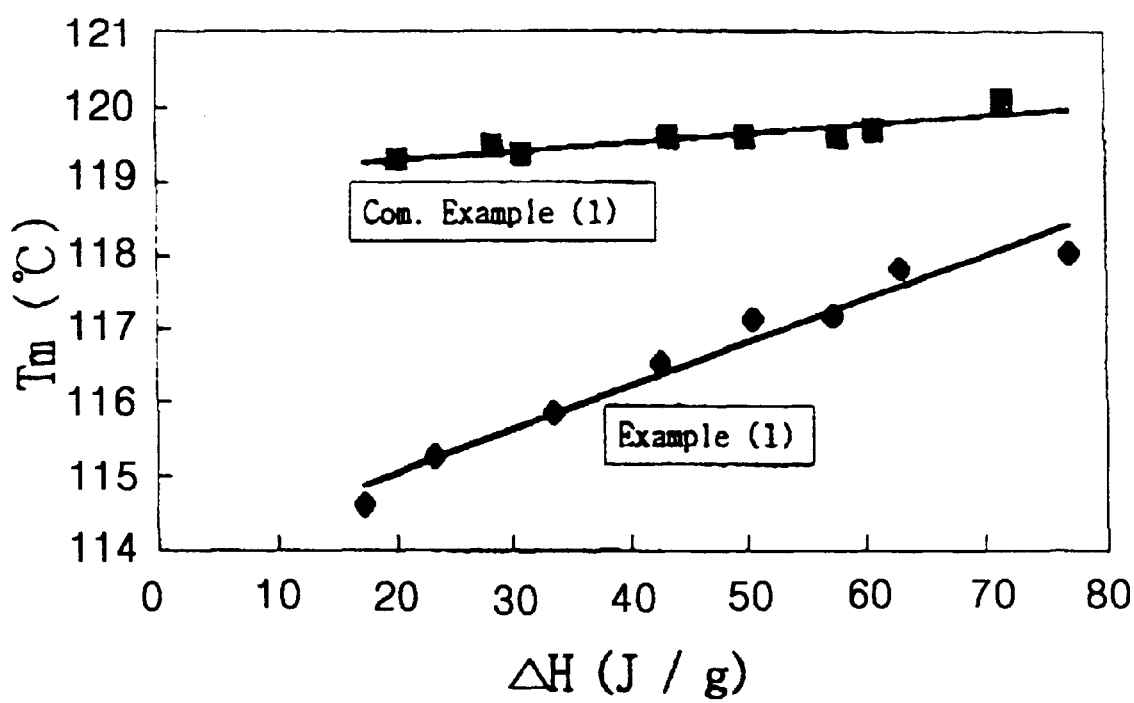

CATALYST SYSTEM FOR OLEFIN POLYMERIZATION AND ITS USE

FIELD OF THE INVENTION

This invention relates to a heterogeneous catalyst system comprising a novel transition metal catalyst component(1) supported on such an inorganic carrier as magnesium halide [B] and an organometallic aluminum cocatalyst component (2), and to a process for polymerization of olefin using the said catalyst system. More particularly, the present invention relates to a novel transition metal catalyst component(1) which employs titanium compounds[A] containing carbodiimide ligands and to a process for preparing a heterogeneous transition metal catalyst component(1) supported on such an inorganic carrier as magnesium halide[B]. The catalyst system so prepared shows an excellent (co) polymerization properties and produces copolymers having a narrow compositional distribution, a broad molecular weight distribution and excellent morphological properties such as spherical shape and a high bulk density.

BACKGROUND OF THE INVENTION

Conventional Ziegler-Natta Catalysts based on Magnesium halide and titanium halide compounds have advantages of easy control of the morphology of polyolefin, however, when they are employed in the process of copolymerization, they tend to produce copolymers having broad compositional distribution, resulting in inadequate physical properties in impact strength, transparency, antiblocking, and in heat-sealing temperature. Metallocene catalysts have been developed which show excellent copolymerization properties such as impact strength, transparency, anti-blocking, and heat-sealing temperature. Recently, metallocene compounds with special substituents, which can control the electronic or steric environment of olefin polymerization, and the stereoregularity and molecular weight of polymer, have also been developed. But still they have several such disadvantages, when applied in a commercial plant, such as complicated synthetic steps, additional capital investments, the need to modify existing processes and poor processibility due to this narrow molecular weight distribution.

Meanwhile, several inventions have been made employing oxygen or heteroatom-bound chelated transition metal compounds, and they have attracted keen attention, because these compounds are easier to synthesize than metallocene compounds, and may be used as an alternative to metallocene compounds.

Japanese Laid-Open Patent Sho 63-191811 disclosed the chelated catalysts for ethylene and propylene polymerization, in which chlorides of titanium chloride compound are replaced by TBP ligand (6-tert butyl-4-methylphenoxy). With a methylaluminoxane (MAO) cocatalyst, it was reported, polymerization of ethylene and propylene with excellent activity and a high molecular weight (Mw=3,600,000) was possible. U.S. Pat. No. 5,134,104 to Sasati, et. al. reported chelate catalysts employing an amine substituted titanium halide compound, $\{(C_8C_{17})_2NTiCl_3\}$ and the results of olefin polymerization with these catalysts, while in J. Am. Chem. Soc., 117, 3008, catalysts using oxygen-bound chelated transition metal compounds which localize the coordination sphere of transition metal compounds were introduced. Also transition metal compounds chelated with phenoxy derivative ligands were reported in Japanese Laid-Open Patent Hei 6-340711 and EP 0606125A2, which, with MAO as cocatalyst, produced a high molecular weight polymer which has a narrow molecular weight distribution.

Recently, several transition metal compounds chelated with carbodiimide ligands have been publicized. Synthesis and characterization of titanium compounds containing carbodiimide ligands were reported in *Organometallics* 1996, 15,2627 and *Chem. Commun.* 1996, 2623, and chemistry of carbodiimide compounds was introduced in *Coord. Chem. Rev.* 1994, 137,403, *Inorg. Chem.* 1997, 36,501, and *Inorg. Chem.* 1996, 35,1423. Also, U.S. Pat. No. 5,502,128 to Flores, et. al. disclosed a homogeneous catalyst system employing transition metal compounds, carbodiimide ligand with MAO as cocatalyst.

However, the synthetic methods reported so far require additional separation procedures for lithium chloride or complicated synthetic routes to prepare pure carbodiimide compounds, and these catalyst systems, being homogeneous catalyst systems, still require the expensive MAO as a cocatalyst to polymerize olefin, and the copolymerization properties of these compounds have never been reported. Nor has there been reported an example of heterogeneous catalyst systems employing transition metal compounds chelated with carbodiimide ligands, which can control the morphology of polymer.

SUMMARY OF THE INVENTION

In accordance with the present invention, there is provided a heterogeneous catalyst system comprising (1) a transition metal catalyst component supported on such an inorganic carrier as magnesium chloride[B], which is prepared by reacting titanium compound [A] containing carbodiimide ligands with such an inorganic carrier [B] as magnesium halide and (2) an organometallic aluminum cocatalyst component. The titanium compounds [A] containing carbodiimide ligands are prepared by direct reaction of carbodiimide compounds with a titanium halide compound followed by an additional reaction with reducing aluminum compounds. The inorganic carrier [B] is prepared by reacting a Grignard reagent with allyl halide compounds, resulting in magnesium chloride with excellent morphological properties.

In another embodiment of the invention is provided a process for (co)polymerization to produce olefin polymers having a narrow comonomer compositional distribution, a broad molecular weight distribution and some excellent morphological properties such as a spherical shape and a high bulk density.

DESCRIPTION OF THE DRAWING

FIG. 1 is a graph of a plot of melting point temperature (Tm) vs. enthalphy (Δ H) for ethylene/1-hexene copolymers, prepared with the catalyst system of this invention (Example 1) and the catalyst system of conventional titanium based catalyst system (Comparative Example 1).

DETAILED DESCRIPTION OF THE INVENTION

Transition Metal Catalyst Component(1)

According to the present invention, the transition metal catalyst component (1) is prepared by reacting titanium compounds [A] with such inorganic carrier [B] as magnesium halide and titanium compound [A] in this invention contains carbodiimide and an aluminum element, which is prepared via the special synthetic method described in the equation (1). That is, the product of the reaction of titanium halide with carbodiimide in the presence of an alkyl halide solvent is further reacted with an organometallic aluminum compound having a reducing capability to result in the formation of a titanium compound [A] containing carbodiimide and an aluminum compound.

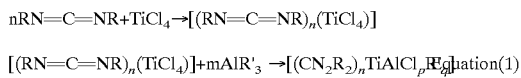

Titanium Compound [A]

(where R is an aliphatic, aromatic hydrocarbon or silane compound R' is alkyl group of carbon number 2 to 8 ; n=1 or 2 ; m≦1; p=1~4; q=1~3)

In preparation of the titanium compound [A], the carbodiimide compounds could be such dialkylcarbodiimides as dicyclohexylcarbodiimide, ditolylcarbodiimide, diisopropylcarbodiimide, and bis(trimethylsilyl) carbodiimide.

The reaction of carbodiimide with titanium halide could be performed in the presence of such organic solvents as toluene, heptane, dichloromethane, chlorobenzene, chloroform, carbontetrachloride, dibutyl ether, diethyl ether, tetrahydrofuran, and preferably such alkyl halide solvents as chloroform dichloromethane, chloroform, carbontetrachloride could be used. The product of the reaction of titanium halide with carbodiimide can be used without such further purification. Typically, separation of the product or washing with a solvent, or evaporation of the solvent may not be required before use and washing with a hydrocarbon solvent. Usually an oily compound is resulted from the reaction of titanium halide with carbodiimide in an organic solvent. After the reaction, the aluminum compound with reducing capability could be added to complete the reaction with the organic solvent, which results in the formation of the titanium compound [A] containing carbodiimide ligand and an aluminum compound. The preferred aluminum compound with reducing capability in the present invention are such general organometallic aluminum compound such as triethylaluminum, triisobutyl aluminum, trioctylaluminum, diethylaluminumchloride, and methylaluminoxane. Usually, titanium compound[A] is more air-sensitive than corresponding titanium halide compounds and form oily compounds which can not be characterized easily. But the solubility of the titanium compound[A] tend to be less soluble in hydrocarbon solvent than ether or dichloromethane.

In the present invention, the preferred inorganic carrier[B] is a solid magnesium halide compound in the spherical shape which can be prepared through various methods. The preferred method is the reaction of the Grignard reagent with the particular allyl halide compounds in the presence of an ether solvent, which provides the solid magnesium halide compound with a spherical shape. For example, the Grignard reagent prepared by the reaction of magnesium metal and chlorobenzene in the presence of ether could be employed to react with carbon tetrachloride to result in the spherical shape magnesium chloride at 40–6° C. Also, the reaction of tetrabromocresol with butylmagnesium halide could make the solid magnesium halide compound of spherical shape. Specially, the reaction of butylmagnesiumhalide with tetrabromocresol at low temperature produces a magnesium halide compound in the liquid form, and this liquid magnesium halide compound in an ether solvent can be converted to solid form by raising the temperature to over 40° C. By controlling the speed of heating, the size and shape of solid magnesium halide compound can be controlled. Particularly, the magnesium halide compound prepared by the reaction of the Grignard reagent with alkyl halide does not include a strong Lewis base component such as of the hydroxy group which can poison the active site of a catalyst and so it can be used without further treatment.

In the present invention, the transition metal catalyst component (1) supported on such an inorganic carrier as magnesium halide [B] is prepared through a heterogeneous reaction between the titanium compound [A] and the magnesium halide[B] in the presence of an organic solvent. For example, the oily titanium compound [A] can be dissolved in such organic solvents as toluene, benzene and heptane, and reacted with solid magnesium halide of a spherical shape at high temperature for more than 1 hour to make the titanium compound [A] supported on magnesium halide. Preferably, the oily titanium compound [A] can be dissolved in the mixed solvent of dichloromethane and hydrocarbon solvent such as heptane, decane and toluene, and can be reacted with the solid magnesium halide [B]. The organic solvent in this invention is preferably of such aromatic hydrocarbon as toluene, chlorobenzene, benzene or a mixed solvent of alkyl halide and such a hydrocarbon solvent as the mixture of dichloromethane/heptane, chloroform/heptane or decane. After the titanium compound [A] is reacted with magnesium halide in the mixed solvent, alkyl halide can be distilled off by evaporation at temperature between the boiling points of alkyl halide and hydrocarbon solvent. Since the solubility of titanium compound[A] may be lower in the hydrocarbon solvent than in the mixed solvent, evaporation of alkylhalide solvent would improve formation of the titanium compound[A] supported on magnesium halide [B]. The reacting molar ratio of titanium compound [A] to magnesium halide [B], the ratio of (Ti/Mg), can be 0.05~0.5 and is preferred to be between 0.1 and 0.2. When the molar ratio of (Ti/Mg) is lower than 0.05 or higher than 0.5, the (co)polymerization properties such as activity, the hexane insoluble amount, and morphology of the resulting polymer become worse. After reaction for 1~2 hours, the resulting catalyst can be purified through a decanting and washing procedure.

Organometallic Aluminum Component(2)

The organometallic aluminum component (2) can be described by the general formula of $AlR_nCl_{n-n}$ wherein n=1, 2 or 3 and R is the alkyl group. The aluminum compound containing an alkyl group such as methyl, ethyl, isobutyl, isopropyl, octyl group could also be used for this invention. Also, the aluminum compound may contain an alkyl group and a halide group such as diethylaluminumchloride or ethylaluminumdichloride.

Polymerization and Characteristics

According to the present invention the catalyst system described above can be applied to the Gas phase process and slurry process to (co)polymerize olefin such as ethylene or propylene. Ethylene can be copolymerized with an alpha-olefin having 3 to 10 carbon atoms, preferably 4 to 8 carbon atoms. Examples of the alpha-olefin having 4 to 8 carbon atoms include 1-butene, 1-pentene, 1-hexene and 4-methyl-1-pentene. The transition metal catalyst component (1) can be used in an amount preferably of about 0.001 to about 0.5 millimoles per liter of the polymerization reaction zone, calculated as transition metal atom, and the organoaluminum compound component (2) is used in such an amount that the aluminum/transition metal atomic ratio is from about 1 to about 100. The polymerization temperature may be about 40° C. to about 100° C., and (co)polymerization may be performed in the presence of hydrogen to control the molecular weight of the (co)polymer. Specifically, the catalyst system of the present invention is suitable for the gas phase polymerization to produce Linear Low Density Polyethylene of density between 0.910 and 0.945 g/cm³ without causing any troubles. The polymers produced with the catalyst system of the present invention as Shown in (Example 1), have not only a broad molecular weight distribution with the average molecular weight of 300,000, which can provide excellent processibility, but a narrow comonomer compositional distribution which can make transparent film with excellent anti-blocking properties. Also, the catalyst system of the present invention can be employed for propylene polymerization.

Particularly the narrowness of the comonomer compositional distribution of the copolymers can be analyzed by DSC analysis of copolymers. That is, when the comonomer compositional distribution of a copolymer produced by a catalyst system is narrow, the short chain branches are distributed randomly through the polymer chain, and the lamellar thickness of crystalline portion gets more homogeneous. Because of the homogeneous distribution of the lamellar thickness, the lowering of Tm gets larger or the lamellar thickness gets evenly thinner as the crystalline portion of the polymer is decreased. So, from the plot of Tm vs. ΔH of copolymers containing different levels of comonomer, we can compare the narrownesses of comonomer compositional distribution in copolymers. As is drawn in FIG. 1, Tm of the copolymers produced by the catalyst system of the present invention gets lower than that of the polymers produced by a conventional Ziegler catalyst as ΔH of copolymers is decreased, which indicates the more homogeneous comonomer compositional distribution or more homogeneous distribution of short chain branches through the polymer chain.

EXAMPLES

All reactions were performed under atmosphere of nitrogen or argon. Solvents and chemicals were purified or dried in a standard manner.

(a) Synthesis of Grignard Reagent(1)

32 g of chip-form magnesium metal for Grignard was placed in 1-liter flask equipped with a stirrer, a reflux condenser and a dropping funnel. 60 ml of butyl ether was added to cover the surface of the metal, and 0.13 g of $I_2$ and 2 ml BuCl were added to flask at 60° C. to initiate the reaction. After initiation of the reaction, 50 ml $Bu_2O$ and 40 ml chlorobenzene were added at 65° C. and temperature was raised to 92° C.

Then, a mixture of 100 ml chlorobenzene and 260 ml butyl ether was added over one hour keeping the temperature around 96° C. After the addition, the solution was stirred at 96° C. for three more hours and the liquid portion was separated to get 400ml of the Grignard(1) solution. the Grignard Reagent(1) in butyl ether was hydrolyzed with an 1N sulfuric acid aqueous solution, and was back titrated with an 1N sodium hydroxide aqueous solution to get a concentration of 1.0 mol/liter.

(b) Synthesis of Grignard Reagent(2)

32 g of chip-form magnesium metal for Grignard was placed in 1-liter flask equipped with a stirrer, a reflux condenser and a dropping funnel. 120 g of butyl chloride and 500 ml of butyl ether were added in the dropping funnel and about 30 ml of the mixture was added dropwise to magnesium in the flask to initiate the reaction.

After initiation of the reaction, the dropwise addition was continued at 50° C. for 4 hours. After completion of the dropwise addition, the reaction was further continued at 60° C. for 1 hour. The reaction mixture was cooled to room temperature and the solid portion was filtered off to get the Grignard Reagent(2). the Grignard Reagent(2) in butyl ether was hydrolyzed with an 1N sulfuric acid aqueous solution, and was back titrated with an 1N sodium hydroxide aqueous solution to get a concentration of 2.0 mol/liter.

Example 1

[Preparation of Solid Transition Metal Catalyst Component(1)]

9.40 g of dicyclohexylcarbodiimide was dissolved in 100 ml $CH_2Cl_2$, and 5 ml of $TiCl_4$ was added obtain a red solution. Then the solution was stirred for 24 hours. The color of the solution changed from red to deep brown. To the resulting solution, 14 ml of 1M $(Octyl)_3Al$ in hexane was added at room temperature and the solution was stirred for 3 hours to get a bright purple solution. 1000 ml hexane was added to separate an oily purple compound, and the oily compound was washed three times in hexane to get the titanium compound[A].

Meanwhile, a solid magnesium halide[B] compound was prepared by the reaction of the Grignard Reagent(1) and carbon tetrachloride. 250 ml of the Grignard Reagent(1) was placed in 1-liter flask, and the flask was heated to 50° C. 40 ml $CCl_4$ and 100 ml butyl ether were mixed and charged to dropping funnel. A $CCl_4$ solution was added dropwise to the Grignard solution while keeping temperature of the Grignard solution between 50° C. and 60° C. over 3 hour by controlling the speed addition. After completion of the addition, the solution was heated to 70° C. and stirrerd for 1 hour.

Then, the liquid portion was filtered off, and the solid portion was washed in hexane three times to get solid magnesium halide [B].

To the solid magnesium halide[B] prepared as above, 600 ml of heptane was added, and the solution was stirred at 50° C. The titanium compound [A] prepared as above was dissolved in 100 ml $CH_2Cl_2$, and was added to solid magnesium halide [B] slurry solution. The mixture was heated to 60° C., and stirred for 1 hour. Then, the temperature was raised to 80° C., and $CH_2Cl_2$ was distilled off for 1 hour. The resulting slurry solution was stirred at 80° C. for 1 more hour. The solid portion was filtered and washed in hexane three times at 50° C. to get a solid transition metal catalyst component(1). ICP analysis of the solid catalyst component (1) shows 18.9% Mg, 1.6% Ti content.

[Ethylene Polymerization]

A 2-liter capacity autoclave was thoroughly purged with nitrogen, charged with 1000 ml of purified hexane, and purged with ethylene at room temperature. The temperature was raised and at 60° C. to 65° C., 3 millimoles of triethylaluminum in hexane solution and subsequently 0.03 millimoles, calculated as titanium atom, of the solid titanium catalyst component were added. The autoclave was sealed and pressurized with hydrogen until the total volume of hydrogen input reached 500 ml. Then the total pressure was raised to 6 kg/cm².G with ethylene, and the polymerization was carried out at 70° C. for 1 hour. 200 g of polymer was obtained. MFR(2.16 kg/10 min) of the resulting polymer was 0.1 and Mw/Mn was 7.8. The polymer of spherical shape having a bulk density of 0.39 was obtained, the average particle size being 500 μm.

[Ethylene/1-Hexene Copolymerization]

A 2-liter capacity autoclave was thoroughly purged with ethylene, charged with 500 ml of purified hexane, and purged with ethylene at room temperature. After the temperature was raised to 65° C., 2 millimoles of trioctylaluminum in hexane solution and subsequently 0.02 millimoles, calculated as titanium atom, of the solid titanium catalyst component were added. The amount of 1-hexene listed in Table 1 was added, the autoclave was sealed, the total pressure was raised to 2 kg/cm$^2$.G with ethylene, and the polymerization was carried out at 65° C. for 5 min. After the polymerization, ethanol was added to quench the reaction, and the polymer suspension was washed ethanol. The polymer was filtered and analyzed by DSC method, and the results are shown in Table 1, the plot of Tm vs. ΔH being drawn in FIG. 1.

[Propylene Polymerization]

A 2-liter capacity autoclave thoroughly was purged with nitrogen, charged with 1000 ml of purified hexane, and purged with propylene at room temperature. The temperature was raised, and at 70° C., 10 millimoles of triethylaluminum in hexane solution, 10 ml of dimethoxydicyclohexylsilane, and subsequently 0.03 millimoles, calculated as titanium atom, of the solid titanium catalyst component were added. The autoclave was sealed and pressurized with hydrogen until the total volume of hydrogen input reached 250 ml. Then the total pressure was raised to 100 psi with propylene, and the polymerization was carried out at 70° C. for 1 hour. 70 g of polypropylene was obtained. The Bulk density of the resulting polymer was 0.40 and the heptane insoluble portion was 96.8%.

Comparative Example

[Solid Transition Metal Catalyst Component(1) Preparation of]

Solid magnesium halide[B] compound was prepared as Example 1.250 ml of The Grignard Reagent(1) was placed in 1-liter flask and the flask, was heated to 50° C. 40ml CCl$_4$ and 100 ml butyl ether were mixed and charged to dropping funnel. A CCl$_4$ solution was added dropwise to the Grignard solution, while keeping the temperature of the Grignard solution between 50° C. and 60° C. over 3 hours by controlling the speed of addition.

After completion of the addition, the solution was heated to 70° C. and stirred for 1 hour. Then, the liquid portion was filtered off, and the solid portion was washed in hexane three times to get solid magnesium halide [B].

To the solid magnesium halide [B] prepared as above, 600 ml of heptane was added and the solution was stirred at 50° C. Then 43 ml of titanium tetrachloride added to a solid magnesium halide[B] slurry solution. The mixture was heated to 60° C. and stirred for 1 hour. Then, the temperature was raised to 80° C., and the solution was stirred for 1 more hour. The Solid portion was filtered and washed in hexane three times at 50° C. to get a solid transition metal catalyst component in hexane slurry form.

[Polymerization]

Ethylene homo-polymerization and ethylene/1-hexene copolymerization were performed as Example 1 and from the ethylene homo-polymerization 215 g of spherical shaped polymer having a bulk density of 0.37 was obtained. The DSC analysis and density of the polymer obtained were compared with Example 1 in Table 1, and the plot of Tm vs. ΔH being drawn in FIG. 1.

Example 2

A same procedure was followed as Example 1 to make the transition metal catalyst component(1) except that the amount of 18.8 g of carbodiimide, instead of 9.40 g of carbodiimide, was employed to make the titanium compound[A].

Ethylene polymerization and ethylene/1-hexene copolymerization were performed as Example 1. From the ethylene polymerization, 190 g polymer of spherical shape having a bulk density of 0.38 was obtained. Mw/Mn of the resulting polymer was 8.1. The propylene polymerization was done as Example 1, and 100 g of polypropylene was obtained from this propylene polymerization. The Bulk density was 0.41 and the heptane insoluble portion was 96.6%. The DSC analysis of copolymer resulting from ethylene/1-hexene copolymerization was summarized in Table 2.

Example 3

[Preparation of Solid Transition Metal Catalyst Component(1)]

9.40 g of dicyclohexylcarbodiimide was dissolved in 100 ml CH$_2$Cl$_2$, and 5 ml of TiCl$_4$ was added to obtain a red solution. Then the solution was stirred for 24 hours. The color of the solution changed from red to deep brown. To the resulting solution, 14 ml of 1M (Octyl)3Al in hexane was added at room temperature, and the solution was stirred for 3 hours to get a bright purple solution. 1000 ml hexane was added to separate an oily purple compound and the oily compound was washed three times in hexane to get the titanium compound [A].

Meanwhile, the solid magnesium halide [B] compound was prepared by the reaction of the Grignard Reagent(2) and tetrabromocresol. 50 ml of the Grignard Reagent(2) and 200 ml Bu$_2$O were placed in a 1-liter flask. 42.3 g of tetrabromocresol was dissolved in 100 ml Bu$_2$O and added dropwise to the Grignard Reagent(2) at room temperature. After completion of the addition, the liquid form of the magnesium compound was slowly heated to 40° C., while continuously keeping stirring. A white solid was formed slowly by warming up to 40° C. The temperature was raised to 60° C., and the solution was stirred for one more hour. Then the white solid was separated from the liquid portion, and was washed in hexane three times to get the solid magnesium halide [B].

To the solid magnesium halide[B] prepared as above, 600 ml of heptane was added and stirred at 50° C. The titanium compound [A] prepared as above was dissolved in 100 ml CH$_2$Cl$_2$ and added to the solid magnesium halide [B] slurry solution. The mixture was heated to 60° C. and stirred for 1 hour. Then, the temperature was raised to 80° C., and CH$_2$Cl$_2$ was distilled off for 1 hour. The resulting slurry solution was stirred at 80° C. for 1 more hour. The solid portion was filtered and washed in hexane three times at 50° C. to get the solid transition metal catalyst component(1). ICP analysis of the solid catalyst component(1) shows 19.2% Mg, and 1.7% Ti contents.

[Polymerization]

Ethylene polymerization and ethylene/1-hexene copolymerization was performed as Example 1. From the ethylene polymerization, 190 g polymer of spherical shape having a bulk density of 0.38 was obtained. Mw/Mn of the resulting polymer was 8.1. The DSC analysis of copolymer resulting from ethylene/1-hexene copolymerization was summarized in Table 2.

TABLE 1

DSC analysis and density of ethylene/1-hexene copolymerization

| amount of 1-hexene (ml) | (Example 1) Tm(° C.) | ΔH (J/g) | Density (g/cm²) | (Comparative Example) Tm(° C.) | ΔH (J/g) | Density (g/cm²) |
|---|---|---|---|---|---|---|
| 25 | 118.3 | 77.05 | 0.915 | 120.1 | 71.66 | 0.914 |
| 30 | 117.8 | 63.15 | 0.912 | 119.7 | 60.98 | 0.911 |
| 35 | 117.2 | 57.39 | 0.910 | 119.6 | 57.88 | 0.910 |
| 40 | 117.1 | 50.62 | 0.908 | 119.6 | 50.14 | 0.905 |
| 45 | 116.5 | 42.66 | 0.902 | 119.6 | 43.54 | 0.901 |
| 50 | 115.8 | 33.53 | 0.896 | 119.4 | 30.95 | 0.893 |
| 75 | 115.2 | 23.41 | not measured | 119.5 | 28.57 | not measured |
| 100 | 114.6 | 17.29 | not measured | 119.3 | 20.17 | not measured |

TABLE 2

DSC analysis of ethylene/1-hexene copolymerization

| amount of 1-hexene (ml) | (Example 2) Tm(° C.) | ΔH (J/g) | Density (g/cm²) | (Example 3) Tm(° C.) | ΔH (J/g) | Density (g/cm²) |
|---|---|---|---|---|---|---|
| 25 | 118.4 | 75.02 | 0.914 | 118.1 | 74.63 | 0.913 |
| 30 | 117.7 | 62.95 | 0.911 | 117.5 | 60.36 | 0.910 |
| 35 | 117.1 | 57.21 | 0.909 | 117.3 | 57.13 | 0.909 |
| 40 | 116.2 | 42.11 | 0.907 | 116.5 | 43.56 | 0.908 |
| 45 | 115.5 | 31.22 | 0.901 | 115.5 | 31.32 | 0.901 |
| 50 | 113.9 | 18.85 | 0.892 | 114.8 | 23.54 | 0.897 |

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A catalyst system for olefin polymerization, comprising:
   a heterogeneous catalyst component employing a titanium compound supported on an inorganic carrier, the inorganic carrier comprising magnesium halide;
   wherein said titanium compound is the product of a sequential reaction of titanium halide with a carbodiimide compound and an organometallic aluminum compound, and is represented by a general formula:

$[(RN{=}C{=}NR)_n TiAlCl_p R'_q]$ where R is an aliphatic hydrocarbon, an aromatic hydrocarbon or a silane compound; R' is an alkyl group having 2 to 8 carbon atoms; n=1–2; p=1–4; and q=1–3;
   wherein the organometallic aluminum compound has the general formula, $R''_y AlCl_{3-y}$ where R'' is an aliphatic hydrocarbon and n=2–3.

2. The catalyst system of claim 1, wherein said titanium compound is prepared by the sequential process of reacting titanium halide with carbodiimide compound and reacting an organometallic aluminum compound with the reaction product of the titanium halide with the carbodiimide compound in situ, as described in equation (1), $n\ RN{=}C{=}NR + TiCl_4 \rightarrow [(RN{=}C{=}NR)_n(TiCl_4)]$ $[(RN{=}C{=}NR)_n(TiCl_4)] + m\ AlR'_3 \rightarrow [(RN{=}C{=}NR)_n TiAlCl_p R'_q]$ (1)

where R is an aliphatic hydrocarbon, an aromatic hydrocarbon or a silane compound; R' is an alkyl group having 2 to 8 carbon atoms; n=1–2; m≦1; p=1–4; and q=1–3.

3. The catalyst system of claim 1, wherein the heterogeneous catalyst component is prepared by the process comprising reacting said titanium compound with said magnesium halide in the presence of a mixed solvent of a hydrocarbon solvent and an alkyl halide solvent and evaporation of said alkyl halide solvent by heating at a temperature between boiling points of said hydrocarbon solvent and said alkyl halide solvent.

4. The catalyst system of claim 3, wherein the reaction of said titanium compound with magnesium halide is performed under such that the mole ratio of Ti/Mg is from 0.05 to 0.2.

5. The catalyst system of claim 1, wherein said inorganic carrier is prepared by the process of reacting a Grignard reagent with an alkyl halide in the presence of butyl ether.

6. A method for preparing a catalyst comprising a titanium compound supported on an inorganic carrier, comprising:
   reacting a titanium halide with a carbodiimide compound to form an intermediate product having the general formula, $(RN{=}C{=}NR)_n(TiCl_4)$ where R is an aliphatic hydrocarbon, aromatic hydrocarbon or silane compound; and n=1–2;
   reacting the intermediate product with an organometallic aluminum compound to form the titanium compound, the organometallic aluminum compound having the general formula, $R''_y AlCl_{3-y}$ where R'' is an aliphatic hydrocarbon and n=2–3; and wherein the titanium compound has the general formula, $[(RN{=}C{=}NR)_n TiAlCl_p R'_q]$ where R is an aliphatic hydrocarbon, aromatic hydrocarbon or silane compound; R' is an alkyl group having 2 to 8 carbon atoms; n=1–2; p=1–4; and q=1–3; and
   reacting the titanium compound with magnesium halide to form the catalyst.

7. The method of claim 6, wherein reacting the titanium compound with the magnesium halide comprises:
   mixing the titanium compound and the magnesium halide in the presence of a mixed solvent, the mixed solvent comprising a hydrocarbon solvent and an alkyl halide solvent; and
   evaporating the alkyl halide solvent by heating at a temperature between the boiling points of the hydrocarbon solvent and the alkyl halide solvent.

8. The method of claim 6, wherein the magnesium halide is prepared by the process of reacting a Grignard reagent with an alkyl halide in the presence of butyl ether.

9. The method of claim 6, wherein the reaction of the titanium compound with the magnesium halide is performed such that the mole ratio of Ti/Mg is from 0.05 to 0.5.

10. A catalyst system for olefin polymerization, comprising:

a heterogeneous catalyst comprising a titanium compound supported on an inorganic carrier, wherein the inorganic carrier comprises a magnesium halide, and wherein the titanium compound is represented by the general formula, $$[(RN=C=NR)_n TiAlCl_p R'_q]$$

where R is an aliphatic hydrocarbon, aromatic hydrocarbon or silane compound; R' is an alkyl group having 2 to 8 carbon atoms; n=1–2; p=1–4; and q=1–3.

11. The catalyst of claim 10, wherein the ratio of the titanium compound to the magnesium halide is between about 0.05 to about 0.5.

* * * * *